Patented Apr. 15, 1930

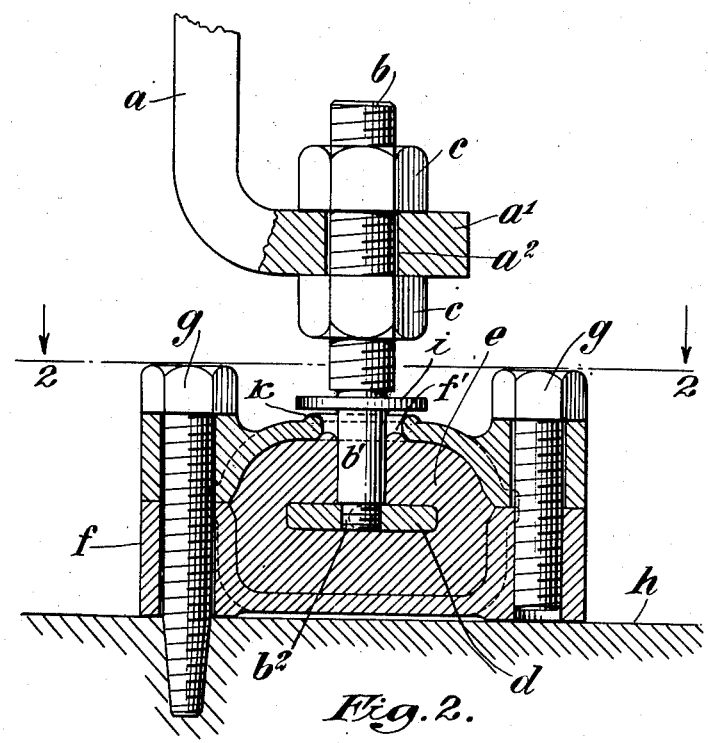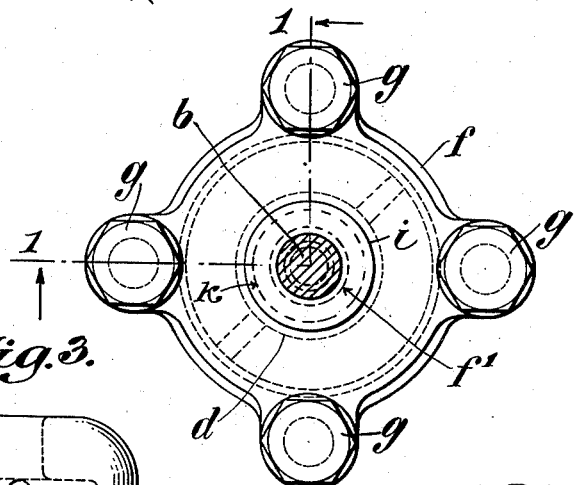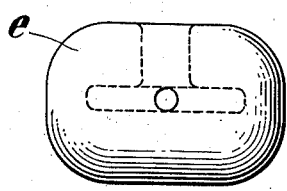

1,754,308

UNITED STATES PATENT OFFICE

ROBERT F. COWELL, OF TEANECK, NEW JERSEY, AND RODGER W. DAVIS, OF FLUSHING, NEW YORK, ASSIGNORS TO INTERNATIONAL MOTOR COMPANY, OF NEW YORK, N. Y., A CORPORATION OF DELAWARE

MACHINE-UNIT SUPPORT

Application filed April 11, 1928. Serial No. 269,259.

This invention relates to the mounting of machinery of a stationary character upon its base, or upon the floor where it is to be used. In many types of machines, particularly where rotating parts thereof tend to vibrate, it is desirable to isolate such vibrations from the surrounding structure as far as possible. Many attempts have been made to provide what is in effect a floating mounting, but the difficulty of maintaining a sufficiently rugged and strong mounting without permitting too great displacement between the machine and the floor has presented problems which have not, as yet, been successfully solved. The present invention relates to a mounting for a machine wherein the deleterious vibrations are deadened sufficiently to relieve the surrounding structure from the weakening effects thereof, at the same time preserving an extremely rugged and positive mounting. The specific design and details of the mounting structure will be described more fully in connection with the accompanying drawings wherein:

Figure 1 is a view in section, taken on line 1—1 of Figure 2 and looking in the direction of the arrows.

Figure 2 is a view in section, taken on line 2—2 of Figure 1 and looking in the direction of the arrows.

Figure 3 is a view in elevation, showing the cushioning element which deadens the vibrations transmitted from the machine to the floor or base.

In the above drawings, $a$ designates a bracket which is secured to a machine and serves as a means for mounting it upon the floor.

This bracket is formed with an extension $a'$ having an aperture $a^2$ through which a bolt $b$ may extend. Spaced nuts $c$, threaded on the bolt $b$, engage the extension $a'$ and secure the bracket and machine in a desired position.

Bolt $b$ is provided with an extension $b'$ having a restricted and threaded portion $b^2$. A disk-shaped foot $d$ is screwed on the threaded portion $b^2$ and provides upper and lower bearing surfaces for a block $e$ of yielding, non-metallic material, such as rubber. If desired, this block may be formed in two parts to facilitate the mounting of the bolt, in which case the block could be split in a horizontal plane. A two part housing $f$ is formed with an aperture $f'$ to receive the bolt extension $b'$ and the block of yielding, non-metallic material $e$. This cushioning material is placed under a predetermined degree of compression by means of bolts $g$, some of which may extend through the housing and secure it to the floor, or base $h$. After the extension $b'$ and disk-shaped foot $d$ have been inserted in the cushioning material $e$, the latter is placed within the housing $f$ and the bolts $g$ are tightened. The bracket is then placed on the bolt $b$ and adjusted to the proper position by means of nuts $c$.

In order that the cushioning material may be protected from oil and deleterious matter, a flange $i$ is formed on the bolt $b$ to prevent oil from following the metal into the rubber. Cooperating with the flange is a bead $k$ formed around the aperture of the housing to prevent any oil drip from running into the housing.

The specific bearing member received by the yielding, non-metallic material may be formed in many shapes and, if desired, may be formed integral with the bolt extension $b'$. Likewise the housing design and related structure may be adjusted to accommodate various shapes or sizes of cushioning elements, in accordance with the requirements of individual installations and no limitation is to be placed upon the invention, save as defined in the appended claims.

We claim as our invention:

1. A support for a machine comprising a housing, including an apertured cover, a bracket, a member carried by the bracket and extending through the aperture, yielding, non-metallic material in the housing, means to secure the housing to a base and simultaneously place the yielding, non-metallic material under compression, means to secure the end of the member in the yielding, non-metallic material, a flange carried by the said member and extending over the aperture, and a bead formed about the periphery of the aperture.

2. A device for supporting a machine on a base, comprising a housing having a portion adapted to abut against the base and an apertured cover portion adapted to cooperate with the first named portion to form an interior closed except for the aperture, a bracket, a member carried by the bracket and extending through the aperture, yielding, non-metallic material in the housing, common means external of the housing to secure the cover to the housing to place the yielding, non-metallic material under compression and to secure both portions of the housing to the base, and an enlarged portion on the end of said member seated in and surrounded by the yielding, non-metallic material.

This specification signed this 31st day of March, A. D. 1928.

ROBERT F. COWELL.
RODGER W. DAVIS.